Feb. 19, 1952  W. SCHAFROTH  2,586,388
CLIP WITH BENDABLE LEGS
Filed June 10, 1948
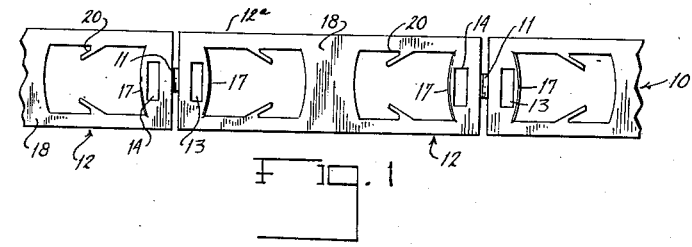
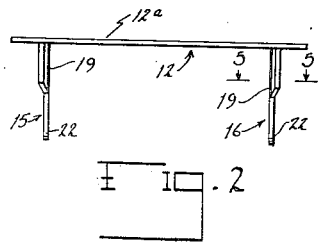
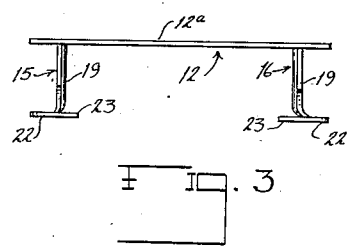
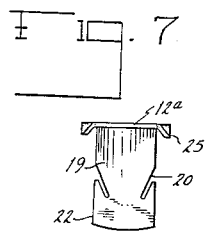
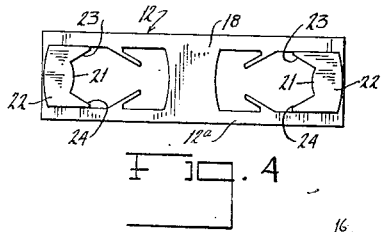
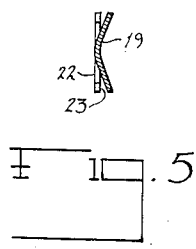
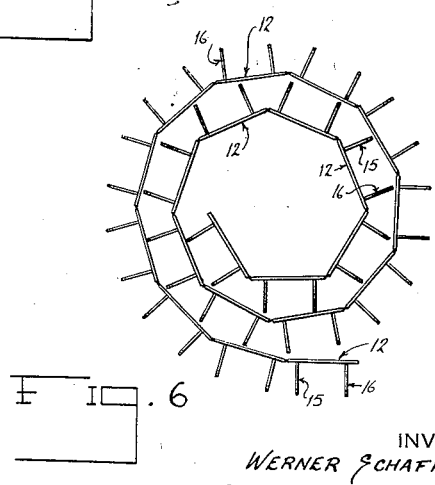
INVENTOR.
WERNER SCHAFROTH
BY
HIS ATTORNEY Patented Feb. 19, 1952

2,586,388

UNITED STATES PATENT OFFICE 2,586,388

CLIP WITH BENDABLE LEGS

Werner Schafroth, Havertown, Pa.

Application June 10, 1948, Serial No. 32,125

4 Claims. (Cl. 85—49)

This invention, in general, relates to means for fastening pieces of material and, more particularly, to an improved fastener or clip designed and adapted for securing two or more pieces of material together from an outside surface.

The principal object of the invention is to provide a fastening clip of a novel and more effective type, and particularly adapted for retaining sheet and/or other material together by means applied from the outside surface of said material.

Another object is to provide a fastening clip struck from a continuous metal ribbon and preformed for insertion through the material to be secured and then adapted for clinching and anchoring in said material.

A further object is the provision of a commercial type fastening clip for material, having improved means for securing sheets, layers, sections and/or pieces of material together and preventing its accidental detachment therefrom.

A still further object is the provision of an improved fastening clip especially adapted for quantity production and effective to securely fasten sheet and/or other box-making material together.

The invention broadly contemplates the provision of means for fastening sheet and/or other material together, such as used in the manufacture of boxes, containers and the like. The herein mentioned fastening means are made available for use in the form of a series of preformed, connected clips adapted to be operatively applied by suitable mechanism.

The invention particularly contemplates a clip for fastening two or more pieces of material and which is adapted to be applied from the outside surface of the material without the necessity of an anvil or other undersurface backing instrumentalities. Prior to use, a metal ribbon is passed through a punch press to provide a connected series of clips, joined, one to the other, by narrow, severable webs, and each having a pair of depending, bendable clinching legs. These legs, when clinched, have novel anchoring means which increase the clamping effect of the clinched legs and minimize their accidental detachment from the fastened material.

With the foregoing and other objects in view, which will appear as the description proceeds, the invention resides in the combination and arrangement of parts, and in the details of construction hereinafter described and claimed, it being understood that various changes in the precise embodiment of the invention herein disclosed may be made within the scope of what is claimed without departing from the spirit of the invention.

The preferred embodiment of the invention is illustrated in the accompanying drawings, wherein:

Figure 1 is a partial plan view of a series of connected clips conforming to the present invention after their initial die-stamping from a ribbon of metal;

Figure 2 is a side elevational view of one of the clips after separation from the ribbon, and prior to the bending or clinching of the leg members;

Figure 3 is a view similar to Figure 2 but showing the clip in the form it assumes when operatively applied to sheets, layers, sections and/or pieces of material;

Figure 4 is a bottom view of the clip as disclosed in Figure 3;

Figure 5 is a transverse sectional view taken on line 5—5 of Figure 2, as seen in the direction of the arrows;

Figure 6 is a side elevation view, on a reduced scale, of a series of the connected clips arranged in roll form; and Figure 7 is an end elevational view of a slightly modified form of the clip.

In the drawings wherein similar characters of reference indicate corresponding parts in the several views of the preferred form of the invention, the numeral 10 designates generally a strip or roll of sheet metal which has been passed through a punch press to provide a series of clips conforming to the invention and, as best shown in Figure 1, joined on either side to similar clips by a narrow web section, as at 11. Each of the clips, designated generally at 12, comprises a rectilinear body portion having a slot 13, 14 arranged adjacent either of its opposite ends. Each clip is further configured by the stamping process to provide a pair of depending tongues or legs 15, 16 of somewhat irregular shape and which are hingedly connected, as at 17, to an adjacent unsevered portion of the ribbon material. The two legs or tongues 15, 16 are separated and arranged on either side of a central web 18 joining the opposite longitudinal sides of the clip.

In further accordance with the invention, each of the legs 15, 16 has an upper portion 19 of arcuate configuration, as viewed in cross-section in Figure 5, which is tapered or cut on its opposite sides, as at 20, to provide a bendable knee or hinge portion, as at 21, which also joins the said upper portion with a lower or shoe portion 22. The lower portion 22, prior to bending, is substantially straight, as best shown in Figure 2.

The straight lower portion 22 has, integrally formed therewith, two rearwardly or upwardly projecting spaced prongs 23, 24, which are engaged during the spacing or attaching process by suitable means that are effective in their progressive downward movement after contact with the said prongs, to bend the lower portion 22 about the knee or hinge 21 to the position shown in Figure 3. Simultaneously with the bending of the lower portion, the prongs 23, 24 are angled therewith to a position where they extend in a direction opposite to and as a continuation of the said shoe portion. The prongs 23, 24, in addition to the shoe portion 22, serve as anchoring means to securely fasten and prevent accidental detachment of the clip from the material after its insertion and clinching.

The function and mode of utilizing the invention have been in large measure indicated above, but may be summarized as follows:

Clips of the design and construction above described and illustrated are presented to driving mechanism in the form of a continuous series joined together at their ends by the narrow web or tab 11. The actuation of the driving mechanism will sever the end clip from the roll or ribbon mentioned above, and also thrust the legs 15, 16 through the material to be fastened.

Further and progressive action of the driving mechanism will next engage the prongs 23, 24 and thereby cause the bending of the said legs about their knee portion 21 and to the position illustrated in Figure 3, wherein both the shoe portion 22 and the said prongs lie in the same horizontal plane and in clinched position against the under side of the material (not shown).

The spaced slots 13, 14, it is to be understood, serve during the driving process as a means for aiding an element of the driving mechanism to pass therethrough and engage a side of an adjacent leg. The curving of the upper portion of each leg is designed and adapted to stiffen it against bending so that the angling of the lower portion of the leg will take place only at the knee, as described above.

In connection with the prongs 23, 24, it may be further pointed out that they initially serve as abutments to facilitate the bending of the legs 15, 16, and after the legs are clinched, the said prongs serve as anchoring means to minimize detachment of the clip from the material.

In Figure 7, a clip is depicted which is identical in all respects with the first form of the invention, save that a small prong or cleat is provided at each of the four corners of the body portion 12a, as at 25. These prongs 25 are adapted, to further secure and anchor the clip to the material and more especially the body portion thereof which latter is now prevented against any creeping movement relatively to the material to which it is applied. It is to be understood, that the clip is illustrated as it appears before insertion into the material and subsequent clenching.

While preferred embodiments of my invention are set forth, my invention is not to be limited to the exact construction illustrated and described, because various modifications of the details may be provided in putting the invention into practice within the purview of the appended claims.

What I claim is:

1. An integral clip formed from sheet metal comprising a flat base portion, a leg struck from said base portion adjacent each end leaving openings of the same size and shape as said legs in said base portion, each of said legs extending perpendicularly downward from said base portion at said ends, each of said legs having an upper portion and a lower shoe portion defined by a pair of opposed slits that extend inwardly and downwardly from the opposite side of the leg and form prongs on the opposite sides of the leg, said upper portion being deformed into a concave-convex structure leaving said prongs exposed beneath the opening formed by striking that leg from the base portion whereby the upper ends of said prongs are adapted to be engaged by a tool passing through said opening to bend said prongs and lower shoe portion into position substantially parallel to said base portion, with the prongs and shoe portion extending appreciable distances on opposite sides of the leg to form a T head.

2. An integral clip formed from sheet metal comprising a flat base portion, a leg struck from said base portion adjacent each end leaving openings of the same size and shape as said legs in said base portion and transverse end sections of said base portion, each of said legs extending perpendicularly downward from said base portion and integrally joined to the inner edge of its respective end section, each of said legs having an upper portion and a lower shoe portion defined by a pair of opposed slits that extend inwardly and downwardly from the opposite side of the leg and form prongs on the opposite sides of the leg, said upper portion being deformed into a concave-convex structure leaving said prongs exposed beneath the opening formed by striking that leg from the base portion whereby the upper ends of said prongs are adapted to be engaged by a tool passing through said opening to bend said prongs and lower shoe portion into position substantially parallel to said base portion with the prongs and shoe portion extending appreciable distances on opposite sides of the leg to form a T head, each of said end sections being formed with a slot that is adapted to accommodate a tool for supporting the upper portion of the immediately adjacent leg during the bending of said prongs and lower shoe portion.

3. An integral clip formed from sheet metal comprising a flat base portion, a leg struck from said base portion adjacent each end leaving openings of the same size and shape as said legs in said base portion, each of said legs extending perpendicularly downward from said base portion at said ends, each of said legs having an upper portion, an intermediate bendable knee portion, and a lower shoe portion defined by a pair of opposed slits that extend inwardly and downwardly from the opposite side of the leg and form prongs on the opposite sides of the leg, said upper portion being deformed into a concave-convex structure leaving said prongs exposed beneath the opening formed by striking that leg from the base portion whereby the upper ends of said prongs are adapted to be engaged by a tool passing through said opening to bend said knee portion and cause said prongs and lower shoe portion to assume a position substantially parallel to said base portion, with the prongs and shoe portion extending appreciable distances on opposite sides of the leg to form a T head.

4. An integral clip formed from sheet metal comprising a flat base portion, a leg struck from said base portion adjacent each end leaving openings of the same size and shape as said legs in said base portion and transverse end sections of said base portion, each of said legs extending perpendicularly downward from said base portion and integrally joined to the inner edge of its respective end section, each of said legs having an upper portion, an intermediate bendable knee portion, and a lower shoe portion defined by a pair of opposed slits that extend inwardly and downwardly from the opposite side of the leg and form prongs on the opposite sides of the leg, said upper portion being deformed into a concave-convex structure leaving said prongs exposed beneath the opening formed by striking that leg from the base portion whereby the upper ends of said prongs are adapted to be engaged by a tool passing through said opening to bend said knee portion and cause said prongs and lower shoe portion to assume a position substantially parallel to said base portion with the prongs and shoe portion extending appreciable distances on opposite sides of the leg to form a T head, each of said end sections being formed with a slot that is adapted to accommodate a tool for supporting the upper portion of the immediately adjacent leg during the bending of said prongs and lower shoe portion.

WERNER SCHAFROTH.

REFERENCES CITED

The following references are of record in the file of this patent:

UNITED STATES PATENTS

| Number | Name | Date |
|---|---|---|
| 431,175 | Southwick | July 1, 1890 |
| 461,177 | Arnold | Oct. 13, 1891 |
| 1,196,374 | Mader | Aug. 29, 1916 |
| 1,270,193 | Nelson | June 18, 1918 |
| 1,939,631 | Randall | Dec. 12, 1933 |
| 2,073,037 | Weber | Mar. 9, 1937 |
| 2,122,814 | Hansen | July 5, 1938 |
| 2,302,559 | La Place | Nov. 17, 1942 |
| 2,324,654 | Tinnerman et al. | July 20, 1943 |

FOREIGN PATENTS

| Number | Country | Date |
|---|---|---|
| 16,246 | Great Britain | July 31, 1908 |
| 15,498 | Netherlands | Dec. 15, 1926 |